Aug. 1, 1944.   W. E. ADDICKS   2,354,787
CONTROLLER FOR ELECTRIC MOTORS
Filed Dec. 7, 1942
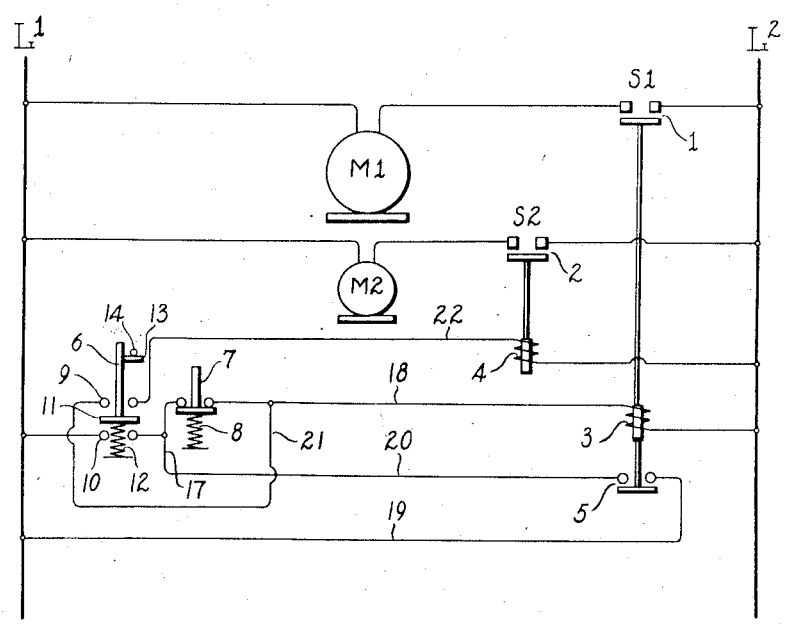
Inventor
Walter E. Addicks
By Faulk H Hubbard
Attorney Patented Aug. 1, 1944

2,354,787

UNITED STATES PATENT OFFICE 2,354,787

CONTROLLER FOR ELECTRIC MOTORS

Walter E. Addicks, Wellesley Hills, Mass., assignor to Cutler-Hammer, Inc., Milwaukee, Wis., a corporation of Delaware Application December 7, 1942, Serial No. 468,067

6 Claims. (Cl. 172—179)

This invention relates to controllers for electric motors.

In the machine tool field the controlled machine frequently is provided with two or more motors, as for example a main driving motor and a motor for operating a coolant pump, and in some installations it is important to start the coolant motor when starting the driving motor, whereas at times the machine may be used for work rendering a coolant unnecessary, and operation of the second motor wasteful of power. Also it may be necessary or desirable to locate the control box as well as the motors at the rear of the controlled machine, whereas the operator may stand at the front of the machine, thus rendering highly desirable remote control through the medium of a small control station, and the present invention although not limited thereto relates particularly to control for such machines.

An object of the invention is to afford the aforeindicated desirable control of two motors through the medium of a remote control station which may be embodied in a very simple and compact form and which may be easily and conveniently operated.

Another object is to provide control of the aforementioned character enabling easy and quick adjustment which pending a further intentional adjustment will always afford starting of both motors or of only one of the motors, according to the adjustment last made.

Another object is to provide control of the aforementioned character which according to its adjustment will afford starting of both motors or of one motor only by operating a single push button or the like without need of change in manipulation thereof for starting.

Other objects and advantages will hereinafter appear.

One embodiment of the invention is diagrammatically illustrated in the accompanying drawing, and the same will now be described, it being understood that the embodiment illustrated is susceptible of modification without departing from the scope of the appended claims.

Referring to the drawing, the same shows motors MI and M2 which may be assumed to be respectively the driving motor and the coolant motor for a machine tool. The motors may, of course, be of any preferred type to be supplied with power from a suitable source, as for example, lines LI, L2.

The control means illustrated comprises an electroresponsive switch SI having contacts I to connect motor MI across lines LI, L2, and an electroresponsive switch S2 having contacts 2 to connect motor M2 across lines LI, L2. The switches SI and S2 are of the normally open type to be closed by energization of their windings 3 and 4, respectively. The switch SI is shown as provided with normally disengaged auxiliary contacts 5 for purposes hereinafter set forth.

It will, of course, be understood that the switches SI and S2 are merely representative of any preferred form of starters for the motors MI and M2, and that the starters whether of the simple character illustrated or of a more elaborate character would ordinarily be enclosed in a casing or box to be mounted in any preferred relation to the controlled machine. As aforeindicated it is quite customary in the case of machine tools to mount the control box as well as the motors at the rear of the machine.

Again referring to the drawing, the same shows for remote control of switches SI and S2 a starting push button switch 6 and a stopping push button switch 7. The push button switch 7 has but a single set of contacts which are normally engaged as through the medium of a spring 8. The push button switch 6, on the other hand, has two sets of stationary contacts 9 and 10 and a contact element II to bridge either the contacts 9 or the contacts 10. The contact element II is biased as by a spring 12 toward the contacts 9, whereas the push button of the contact element II has a lateral projection 13 to be engaged with a stop 14 to hold the contact element II out of engagement with contacts 9. As will be understood, the push button projection or lug 13 and stop 14 are merely representative of various well known means for limiting as described the biased movement of a double acting push button switch, subject to release of said switch for full movement upon disengagement of the limiting means, as for example, by rotary movement of the push button such as to disengage the lug 13 from the stop 14. Also as will be understood the lug 13 and stop 14 are representative of well known means which when set to limit movement of the push button remain set until intentionally adjusted and which when set to permit full movement of the push button remain so set pending further intentional adjustment. Thus with the adjustment illustrated it will be observed that depression of the push button causes contact element II to bridge contacts 10, whereas release of the push button merely disengages contact element II from contacts 10 and that adjustment of lug 13 for disengagement thereof from the stop 14 leaves the contact element 11 free to engage and bridge contacts 9 when the push button is released following depression to bridge contacts 10.

With the movement limiting means of the push button switch 6 set as illustrated depression and release of its button affords energization of the switch S1 to start the motor M1 without starting the motor M2. More specifically depression of push button switch 6 completes circuit from line L1 through contacts 10 and 11 by conductor 17, through the contacts of stop switch 7, by conductor 18 through the operating winding 3 of switch S1 to line L2. Release of push button switch 6 tends to deenergize switch S1, but meanwhile said switch has established for itself a maintaining circuit through its auxiliary contacts 5. This circuit extends from line L1 by conductor 19 through contacts 5, by conductors 20 and 17 to and through the stop switch to the winding 3 as previously traced. Thus the motor M1 will start and continue to operate until stopped by failure of power or by depression of push button switch 7 to interrupt the maintaining circuit of the winding 3.

With the lug 13 of push button switch 6 adjusted for full movement of contact element 11 upon release of the push button, depression and release of the push button first effects energization of switch S1 as aforedescribed and then effects energization of switch S2. More specifically with switch S1 closed and with the contacts 9 bridged by contact element 11 circuit may be traced from line L1 to and through the auxiliary contacts 5 of switch S1 to and through the stop push button switch 7 as previously described, by conductor 21 to and through the contacts 9 and 11 of the start switch, by conductor 22 to and through the winding 4 of switch S2 to line L2. Thus switch S2 is energized to start motor M2 and to cause it to continue to operate while motor M1 operates, assuming the contact element 11 to remain in engagement with contacts 9. Of course it will be understood that if desired the switch S2 might be provided with a maintaining circuit rendering its continued energization independent of the push button switch 6, and as will be understood both switches S1 and S2 may be deenergized at any time to stop both motors by merely depressing the stop push button switch 7.

It will be noted that the contacts 5 of the switch S1 in addition to providing a maintaining circuit for said switch also control the circuit of the winding of switch S2 to prevent energization of the latter switch pending prior response of the former switch. Thus after stopping it prevents contact element 11 even though engaging contacts 9 from becoming effective to restart motor M2, until after operation of the push button switch 6 to again energize switch S1 to start motor M1.

As will be obvious, the push button switches 6 and 7 may be embodied in a very simple and compact push button station which may be located as desired, and that as before pointed out operation of the station for operation of both motors or one motor only will be the same, assuming appropriate prior adjustment of the push button lug 13 relative to the stop 14.

It is also to be noted that after motor M1 has been started with the push button switch 6 set to prevent operation of motor M2 the latter motor may be started at any time while the motor M1 is operating merely by adjusting the push button switch 6 for automatic engagement of contacts 11 and 9 and that with both motors operating motor M2 may be stopped by adjusting push button switch 6 to disengage contact 11 from contacts 9. The motor M2 may be thus started and stopped without interfering with the operation of motor M1 and ability of the controller to be so manipulated constitutes a very advantageous characteristic thereof, it being desirable as for "setting up" to have provisions for delay in starting of motor M2 pending a second manipulation of the controller, and it being desirable as for purposes of inspection to have provisions for stopping motor M2 while operation of motor M1 continues. Stopping of motor M2 may be effected merely by depressing and holding down push button 6 as long as desired and then releasing the push button for restarting of motor M2 or the push button may be depressed and adjusted for locking thereof to prevent restarting of motor M2 when the finger is removed from the push button.

What I claim as new and desire to secure by Letters Patent is:

1. The combination with at least two motors, of control means for said motors to effect operation of a given number or a lesser number thereof and comprising a control station having a control element biased in one direction and means to adjust the limit of biased movement of said control element, said control means also comprising separate electroresponsive starting means for said motors controlled by said control element to start the aforementioned given number or lesser number of motors when said control element is operated and released, according to the adjustment of limit of biased movement of said control element.

2. The combination with at least two motors, of control means for said motors to effect operation of a given number or a lesser number thereof and comprising a control station having a control element biased in one direction and means to adjust the limit of biased movement of said control element, said control means also comprising electroresponsive starters individual to said motors, one of said starters being rendered responsive to start its respective motor when said control element is moved against its bias to a given position and another of said starters being rendered responsive to start its respective motor when said control element is moved under its bias to another given position, the aforementioned limit adjusting means according to its setting enabling said control element to return to the last mentioned position or arresting said element to maintain the second mentioned starter inactive.

3. The combination with at least two motors, of control means for said motors to effect operation of a given number or a lesser number thereof and comprising a control station having a control element biased in one direction and means to adjust the limit of biased movement of said control element, said control means also comprising electroresponsive starters individual to said motors and interconnected to render response of one dependent upon prior response of another, the latter starter being rendered responsive by movement of said control element against its bias to a given position and the former starter being rendered responsive or inactive when said element is freed for biased movement according to the limit established therefor by said limit adjusting means.

4. The combination with at least two motors, of control means for said motors comprising electroresponsive starters individual thereto and a push button control switch common to said starters, said push button control switch being biased in one direction and requiring movement in the reverse direction to effect response of certain of said starters, while requiring movement in its biased direction to effect response of another of said starters, response of the latter starter also requiring prior response of the former starter and biased movement of said push button switch to a given position.

5. The combination with at least two motors, of control means for said motors comprising electroresponsive starters individual thereto and a push button control switch common to said starters, said push button control switch being biased in one direction and requiring movement in the reverse direction to effect response of certain of said starters, while requiring movement in its biased direction to effect response of another of said starters, response of the latter starter also requiring prior response of the former starter and biased movement of said push button switch to a given position, said push button switch having means to vary the limit of its biased movement, thereby to render optional energization or inaction of said latter starter following response of said former starter according to the setting of said limit varying means.

6. The combination with at least two motors, of control means for said motors comprising electroresponsive starters individual thereto, a push button control station having a start push button and a stop push button each common to said starters and said start push button being biased to a given position but having limiting means which may be set to restrict its range of movement to exclude such given position, and circuit connections to render response of one of said starters dependent upon such given positioning of said start push button and upon prior response of another of said starters, and to render response of the latter starter dependent upon depression of the start push button to another given position.

WALTER E. ADDICKS.